(12) United States Patent
Emberty et al.

(10) Patent No.: US 6,650,601 B1
(45) Date of Patent: Nov. 18, 2003

(54) HARD DISK DRIVE PICKING DEVICE AND METHOD

(75) Inventors: Robert G. Emberty, Tucson, AZ (US); Craig Klein, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 09/844,131

(22) Filed: Apr. 26, 2001

(51) Int. Cl.[7] .............................................. G11B 17/04
(52) U.S. Cl. ................. 369/30.46; 369/178.01
(58) Field of Search .................. 369/178, 30.46, 369/30.58, 30.43, 30.55, 30.89; 360/92–93

(56) References Cited

U.S. PATENT DOCUMENTS

| | | |
|---|---|---|
| 4,170,031 A | 10/1979 | Beuch et al. |
| 4,761,785 A | 8/1988 | Clark et al. |
| 4,864,511 A | 9/1989 | Moy et al. |
| 5,123,000 A | 6/1992 | Fitzgerald et al. |
| 5,197,055 A | 3/1993 | Hartung et al. |
| 5,289,589 A | 2/1994 | Bingham et al. |
| 5,377,121 A | 12/1994 | Dimitri et al. |
| 5,423,046 A | 6/1995 | Nunnelley et al. |
| 5,638,347 A | 6/1997 | Baca et al. |
| 5,875,063 A | 2/1999 | Corrington et al. |
| 5,915,081 A | 6/1999 | Yamamoto et al. |
| 5,970,030 A | 10/1999 | Dimitri et al. |
| 5,983,357 A | 11/1999 | Sun |
| 6,005,745 A | 12/1999 | Filkins et al. |
| 6,022,180 A | 2/2000 | Motoyama et al. |

*Primary Examiner*—George J. Letscher
(74) *Attorney, Agent, or Firm*—Durando Birdwell & Janke, PLC

(57) ABSTRACT

Disclosed is a hard disk drive picking device and method for transferring a disk drive from one of a plurality of storage bins in a library to a destination wherein the disk drive may be electrically interconnected to a computer. The picking device includes a backplane adapted to provide power or I/O interconnections between the disk drive and the destination during transfer of the disk drive.

39 Claims, 1 Drawing Sheet

HARD DISK DRIVE PICKING DEVICE AND METHOD

TECHNICAL FIELD

The present invention relates to a hard disk drive picking device and method, for use in a library of hard disk drives.

BACKGROUND OF THE INVENTION

Large scale computing devices often employ a library of removable computer memory media to provide for increased storage capability and the sharing of media by multiple hosts. In such a library, the media are shelved in storage bins for retrieval by a robotic picking apparatus or "picker." Such a picker for optical disk media is described in Dimitri et al., U.S. Pat. No. 5,377,121, which is herein incorporated by reference in its entirety. Tape cassettes are another common library media. The library has at least one drive receptacle coupled to one or more host computers that may read or write to the media.

When a host requests a particular medium in the library, the picker is typically commanded to travel to the storage bin in the library where the medium is shelved, grip the medium, remove the medium from the storage bin, travel to a destination drive having input/output ("I/O") connections with the host, insert the medium into the drive, and power the drive.

A problem with these prior art libraries is that optical media provides relatively slow reading and writing, while tape media provides relatively slow random access.

In recognition of these problems, the concept of a library of hard disk drives was developed, which is the subject of the assignee's companion application entitled LIBRARY OF HARD DISK DRIVES WITH TRANSPARENT EMULATING INTERFACE, executed on Apr. 9, 2001 by inventors Kamal Dimitri, Robert G. Emberty, Craig Klein, and Daniel J. Winarski, filed on Apr. 26, 2001, and incorporated herein by reference in its entirety. According to the concept, hard disk drives are stored in associated storage locations in the library. The robotic picker is adapted to couple and decouple a selected disk drive from a destination receptacle that is coupled to the one or more host computers requesting data.

The hard disk drive library provides the advantage of relative speed as compared to libraries employing optical or tape media. Entire hard disk drives, rather than hard disk media, are exchanged in the library to remain within the close mechanical tolerances required for efficient use of this memory element.

In a basic form of the concept, the destination receptacle provides power connections to the disk drive and I/O connections to the host computers, and the robotic picker retrieves the selected disk drive from its storage location, carries the disk drive to and inserts the disk drive into the destination receptacle. The disk drive is then powered and spins up to its operating speed. Finally, when this operating speed is reached, the data on the disk drive may be accessed by the computer.

As may be readily appreciated, all of this movement takes time, and efforts are constantly being made to decrease the time required to access memory elements in the library.

Accordingly, there is a need for hard disk drive picker device and method that provides for decreasing the time required for accessing a selected hard disk drive in a library of hard disk drives.

SUMMARY OF THE INVENTION

Disclosed is a hard disk drive picking device and method according to the present invention for transferring a disk drive from one of a plurality of storage bins in a library to a destination wherein the disk drive may be electrically interconnected to a computer. A device according to the invention includes a gripping element for gripping the disk drive, a translating mechanism for translating the disk drive from the storage bin to the destination, and a backplane adapted to provide power or I/O interconnections between the disk drive and the destination during transfer of the disk drive.

Therefore, it is a principal object of the present invention to provide a novel and improved hard disk drive picking device and method.

It is another object of the present invention to provide a hard disk drive picking device and method that provides for decreasing the time required for accessing a selected hard disk drive in a library of hard disk drives.

The foregoing and other objects, features and advantages of the present invention will be more readily understood upon consideration of the following detailed description of the invention, taken in conjunction with the following drawings.

DETAILED DESCRIPTION OF A PREFERRED EMBODIMENT

Figure 1:
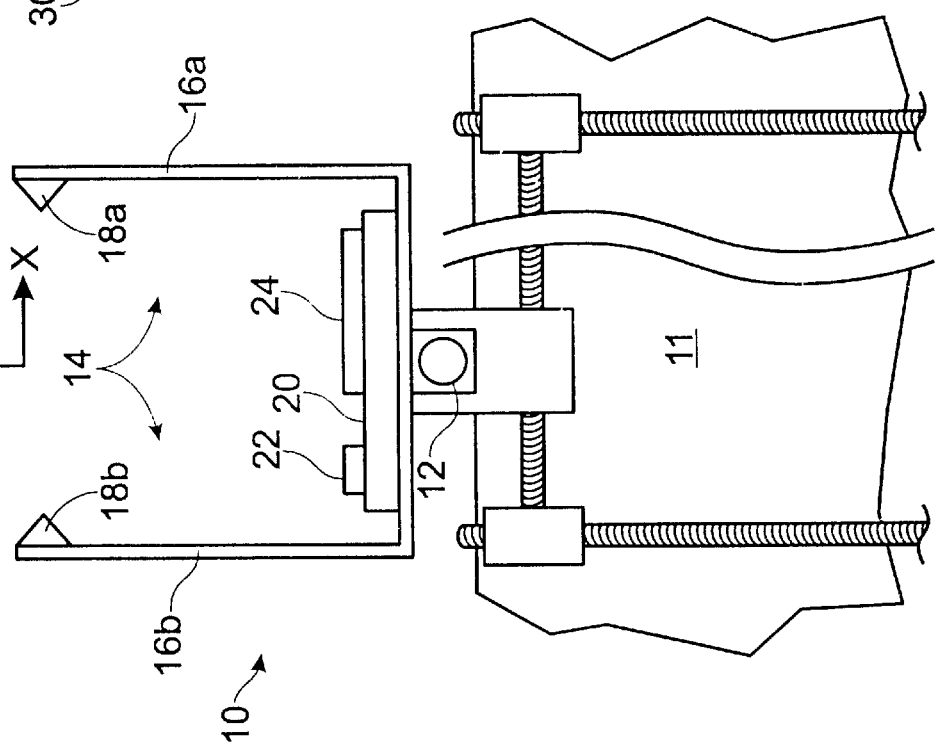
FIG. 1 is a pictorial schematic of a hard disk drive picker according to the present invention.

Referring to FIG. 1, a hard disk drive picker 10 according to the present invention is shown. The picker 10 is provided to move or translate within a library having a plurality of storage bins for storing hard disk drives. The picker translates between selected storage bins and a destination receptacle which is typically though not necessarily a backplane in the library that is in electrical communication with one or more host computers requesting data.

The picker 10 as described herein is particularly advantageous for a library of hard disk drives; however, it should be understood that the picker 10 may be used with suitable modification for other types of memory devices, such as optical disk drives and solid state memory devices such as flash memory modules, without departing from the principles of the invention.

The library typically includes a controller which commands movements of the picker as described below, as well as carries out communications with the host computer(s) as described in the aforementioned companion application. The controller may be a general or special purpose computer.

The picker translates by means of a translating mechanism 11 within a volume that may be defined by the Cartesian coordinates x, y (shown in the Figure) and z. As part of the translating mechanism, a leadscrew 12 is threadably received in by the picker for translating the picker along the z-axis. Translating the picker in the x-z plane permits reaching any selected storage bin in the library.

The picker 10 includes a gripping element 14, which in the preferred embodiment comprises two arms 16a and 16b having respective end effectors 18a and 18b that are suitably adapted to engage complementary features in the disk drives. Translating the picker along the y-axis permits the gripping element 14 to engage the disk drive, to grip it for removal from the storage bin or destination, or to disengage from the disk drive, to release it for placement in the storage bin or destination.

As an outstanding feature of the invention, the picker 10 further includes a backplane 20 having a power output connector 22 adapted to mate with a complementary power input connector on each of the disk drives, and an input/output ("I/O") connector 24 adapted to mate with a complementary I/O connector on the disk drives. The backplane 20 is electrically interconnected with the destination. This provides for many unique modes of operation of the invention.

One such mode of operation provides for using the backplane 20 to power the disk drive and spin it up to operating velocity while it is being translated from the storage bin to the destination. Another mode of operation provides, in addition, for conducting I/O transmissions between the destination and the disk drive through the backplane 20 while the disk drive is being translated from the storage bin to the destination. Still another mode of operation provides for powering the disk drive and conducting I/O transmissions between the disk drive and the destination through the backplane 20 without translating the disk drive from the storage bin to the destination. All of these modes of operation may be provided when translating the disk drive from the destination to the storage bin as well.

As will be readily appreciated by persons of ordinary skill in the art, disk drives cannot be accessed until a minimum spin velocity is reached. Because of the inertia of the disk, the time required to reach this velocity is typically a few seconds after power is,applied. Accordingly, the ability to spin the disk up to operating velocity prior to reaching the destination provides the important improvement of reducing access time. Conducting I/O transmissions while the disk drive is being translated further reduces the time required to access the data on the disk drive. However, it is recognized that accelerations of the disk drive must be limited during the time that I/O transmissions are being conducted. For this purpose, an acceleration sensor may be provided with the picker, or with the disk drives, to signal a control circuit when I/O transmissions may be conducted or when such transmissions may not be conducted during translation of the disk drive. Alternatively, the acceleration of the gripper 10 may be controlled to always remain within limits that permit I/O access to the disk drive. As another alternative, the picker 10 may be controlled to remain within such limits only during selected portions of the total transit time during which I/O access is planned.

The picker may disengage from the disk drive after the disk drive has spun down, e.g., to substantially zero velocity. However, preferably, the picker disengages from the disk drive while the disk drive is spinning down, so that the picker is freed to begin the cycle of accessing another disk drive to further increase its processing speed.

Figure 2:
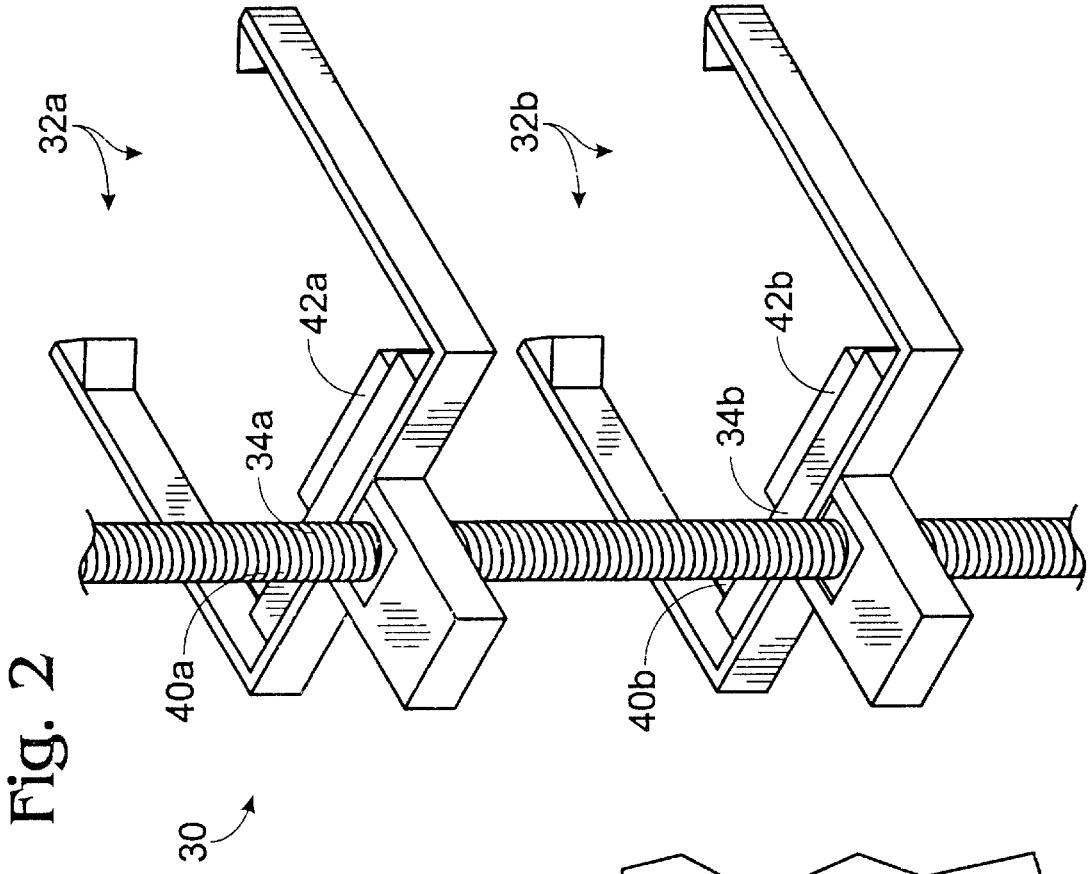
FIG. 2 is a pictorial schematic of a dual gripper hard disk drive picker according to the present invention.

Turning to FIG. 2, a dual gripper picker 30 is shown that provides two gripping elements 32a and 32b. Each gripping element has associated therewith a backplane 34a and 34b which includes, respectively, a power output connector 40a, 40b, and an I/O connector 42a, 42b. The dual gripper picker 30 provides for all of the modes of operation described above as well as additional modes of operation.

According to one such additional mode of operation, the picker 30 translates to a first storage bin holding a first disk drive HDD-1, grips the disk drive HDD-1 with the gripping element 32a and connects HDD-1 to the backplane 34a. I/O transmissions are conducted with HDD-1 while the picker translates to a second storage bin holding a second disk drive HDD-2. The picker 30 grips HDD-2 with the gripping element 32b, connects HDD-2 to the backplane 34b and beings to conduct I/O transmissions therewith.

The picker may thereafter dwell at the second storage bin until I/O transmissions are ceased for one of the disk drives. Then, the picker may place the disk drive for which access was first completed into the second storage bin and one gripping element is free. This method is termed herein "floating home cell."

The picker may now resume to translate to a third storage bin holding a third disk drive HDD-3. The picker grips HDD-3 with the free gripping element and connects HDD-3 to the backplane associated with the free gripping element. The floating home cell methodology may now be continued, providing the outstanding advantage of overlapping the picker travel time with I/O time, substantially reducing access time.

As another additional mode of operation, where I/O is completed for both HDD-1 and HDD-2 before the picker is requested to access HDD-3, the picker may empty itself of both HDD-1 and HDD-2, or it may maintain possession of a selected one of these disk drives in anticipation of further I/O to that may be requested with that disk drive, even if such access has not been requested for some time. For example, this decision may be made because the prior workload for one of the disk drives justifies an expectation that a future request to access data on that disk drive will be made relatively soon compared to the time required to move the disk drive to an open storage bin for storing the disk drive. Alternatively, the decision may be made based on the result of comparing the previous workload, over a selected period of time, with other predetermined criteria. Where the result of such a comparison is true, possession of the disk drive by the gripper is maintained and power to the disk drive is preferably not interrupted.

It is to be recognized that, while a particular hard disk drive picking device and method has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

What is claimed is:

1. A method for communicating between one or more host computers through a destination in a hard disk drive library and one or more disk drives shelved in corresponding storage bins in the library, comprising:

gripping a first disk drive at a first storage bin corresponding to the first disk drive;

translating the first disk drive within the library to a second storage bin corresponding to a second disk drive; and powering the first disk drive during said step of translating.

2. The method of claim 1, further comprising (a) conducting I/O transmissions between the first disk drive and the destination, and (b) conducting I/O transmissions between the second disk drive and the destination, and dwelling at the second storage bin until ceasing one of steps (a) and (b).

3. The method of claim 2, further comprising withdrawing the second disk drive from the second storage bin and placing the one disk drive for which said step of ceasing one of steps (a) and (b) has been taken in the second storage bin.

4. The method of claim 3, further comprising translating the other disk drive for which said step of ceasing one of steps (a) and (b) has not been taken to a storage bin corresponding to a third disk drive.

5. The method of claim 4, further comprising continuing to conduct I/O transmissions between said other disk drive and the destination at least partially during said step of translating said other disk drive to the storage bin corresponding to the third disk drive.

6. The method of claim 2, further comprising ceasing the other of steps (a) and (b), placing one of the disk drives in the second storage bin and maintaining possession of the other disk drive.

7. The method of claim 6, further comprising continuing said step of powering said other disk drive.

8. A method for communicating between one or more host computers through a destination in a hard disk drive library and one or more disk drives shelved in corresponding storage bins in the library, comprising:

gripping a first disk drive at a first storage bin corresponding to the first disk drive;

translating the first disk drive within the library to a second storage bin corresponding to a second disk drive; and powering the first disk drive during said step of translating;

wherein said step of powering the first disk drive at least commences spinning the first disk drive up to operating velocity during said translating.

9. The method of claim 8, further comprising at least commencing to conduct I/O transmissions between the first disk drive and the destination during said step of translating.

10. The method of claim 9, further comprising powering the second disk drive.

11. The method of claim 10, wherein said step of powering the second disk drive results from gripping the second disk drive.

12. The method of claim 11, wherein said step of powering the second disk drive is at least commenced before ceasing said step of powering the first disk drive.

13. The method of claim 12, further comprising at least commencing to conduct I/O transmissions between the second disk drive and the destination before ceasing to conduct said I/O transmissions between the first disk drive and the destination.

14. The method of claim 13, further comprising at least commencing to conduct said I/O transmissions between the second disk drive and the destination before ceasing said step of powering the first disk drive.

15. The method of claim 8, further comprising (a) conducting I/O transmissions between the first disk drive and the destination, and (b) conducting I/O transmissions between the second disk drive and the destination, and dwelling at the second storage bin until ceasing one of steps (a) and (b).

16. The method of claim 15, further comprising withdrawing the second disk drive from the second storage bin and placing the one disk drive for which said step of ceasing one of steps (a) and (b) has been taken in the second storage bin.

17. The method of claim 16, further comprising translating the other disk drive for which said step of ceasing one of steps (a) and (b) has not been taken to a storage bin corresponding to a third disk drive.

18. The method of claim 17, further comprising continuing to conduct I/O transmissions between said other disk drive and the destination at least partially during said step of translating said other disk drive to the storage bin corresponding to the third disk drive.

19. The method of claim 15, further comprising ceasing the other of steps (a) and (b), placing one of the disk drives in the second storage bin and maintaining possession of the other disk drive.

20. The method of claim 19, further comprising continuing said step of powering said other disk drive.

21. A robotic picker for communicating between one or more host computers and one or more disk drives shelved in respective storage bins in a hard disk drive library through a destination in the library, comprising:

a first gripping element for selectably gripping and releasing a first disk drive;

a translating mechanism for translating said first gripping element from the storage bin corresponding to the first disk drive to the destination, and a picker backplane attached proximate said first gripping element, said picker backplane being adapted to provide a first power connection between the first disk drive and a source of electrical power for powering the first disk drive while gripped by said first gripping element over the range of said translating.

22. The picker of claim 21, further comprising a controller for controlling said first gripping element, said translating mechanism, and the transmission of power through said first power connection for controllably powering the first disk drive, and adapted to at least commence spinning the first disk drive up to operating velocity during said translating.

23. The picker of claim 22, wherein said picker backplane further includes a first I/O interconnection between the first disk drive and the destination, and wherein said controller is adapted to at least commence conducting I/O transmissions through said first I/O interconnection during said translating.

24. The picker of claim 23, further comprising a second gripping element for selectably gripping and releasing a second disk drive, wherein said translating mechanism is adapted for translating said first and second gripping elements together, and wherein said picker backplane is adapted to provide a second power connection between the second disk drive and the source of electrical power for powering the second disk drive while gripped by the second gripping element.

25. The picker of claim 24, wherein said controller is adapted for controlling the transmission of power through said second power connection for controllably powering the second disk drive, and for powering the second disk drive before ceasing to power the first disk drive.

26. The picker of claim 25, wherein said picker backplane includes a second I/O interconnection between the second disk drive and the destination, and wherein said controller is adapted to at least commence conducting I/O transmissions through said second I/O interconnection prior to ceasing to conduct said I/O transmissions through said first I/O interconnection.

27. The picker of claim 26, wherein said controller is further adapted to command said translating mechanism to dwell at the second storage bin until ceasing (a) conducting I/O transmissions between the first disk drive and the destination, or (b) conducting I/O transmissions between the second disk drive and the destination.

28. The picker of claim 27, wherein said controller is further adapted to command said gripping mechanism to withdraw the second disk drive from the second storage bin and place the one disk drive for which said ceasing (a) or (b) has occurred in the second storage bin.

29. The picker of claim 28, wherein said controller is further adapted to command said translating mechanism to translate the other disk drive for which said ceasing (a) or (b) has not occurred to a storage bin corresponding to a third disk drive.

30. The picker of claim 29, wherein said controller is further adapted to continue conducting I/O transmissions between said other disk drive and the destination at least partially during said translation of said other disk drive to the storage bin corresponding to the third disk drive.

31. The picker of claim 27, wherein said controller is further adapted to cease the other of steps (a) or (b), place one of the disk drives in the second storage bin, and maintain possession of the other disk drive if the result of comparing the previous workload for the other disk drive against predetermined criteria is true.

32. The picker of claim 31, wherein if said result is true, said controller is adapted to continue powering said other disk drive.

33. A library of hard disk drives for use by one or more host computers communicating with the library through a destination, comprising:
   a plurality of storage bins, each bin being adapted to receive a corresponding one of the hard disk drives; and
   a robotic picker comprising a first gripping element for selectably gripping and releasing a first one of the disk drives, a translating mechanism for translating said first gripping element from one of said storage bins to another, and a picker backplane attached proximate the first gripping element adapted to provide a first power connection between a source of electrical power and the first disk drive for powering the first disk drive over the range of said translating.

34. The library of claim 33, further comprising a library controller for controlling the application of power through said first power connection, wherein said controller is adapted to at least commence spinning the first disk drive up to operating velocity during said translating.

35. The library of claim 33, wherein said picker backplane is adapted to provide a first I/O interconnection between the first disk drive and the destination for conducting I/O transmissions between the first disk drive and the one or more host computers over the range of said translating.

36. The library of claim 35, wherein said library controller is further adapted to at least commence conducting I/O transmissions between the first disk drive and the destination during said step of translating.

37. The library of claim 35, wherein said robotic picking device further includes a second gripping element for selectably gripping and releasing a second one of the disk drives, wherein said translating mechanism is adapted for translating said second gripping element along with said first gripping element, and wherein said picker backplane is adapted to provide a second power connection between the second disk drive and the source of electrical power for powering the second disk drive, and a second I/O interconnection between the second disk drive and the destination for conducting I/O transmissions between the second disk drive and the one or more host computers.

38. The library of claim 37, wherein said library controller is adapted to at least commence conducting said I/O transmissions between the first disk drive and the destination during said step of translating.

39. The library of claim 38, wherein said library controller is further adapted to at least commence conducting said I/O transmissions between the second disk drive and the destination prior to ceasing to conduct said I/O transmissions between the first disk drive and the destination.

* * * * *